(12) United States Patent
Howarth et al.

(10) Patent No.: US 6,970,469 B1
(45) Date of Patent: Nov. 29, 2005

(54) SCHEDULING MEANS FOR DATA SWITCHING APPARATUS

(75) Inventors: Paul Graham Howarth, Manchester (GB); Ian David Johnson, Manchester (GB)

(73) Assignee: Xyratex Technology Limited, Havant (GB)

( * ) Notice: Subject to any disclaimer, the term of this patent is extended or adjusted under 35 U.S.C. 154(b) by 0 days.

(21) Appl. No.: 09/601,695

(22) PCT Filed: Feb. 9, 1999

(86) PCT No.: PCT/GB99/00405

§ 371 (c)(1),
(2), (4) Date: Aug. 7, 2000

(87) PCT Pub. No.: WO99/43131

PCT Pub. Date: Aug. 26, 1999

(30) Foreign Application Priority Data

Feb. 18, 1998 (GB) .................................... 9803301

(51) Int. Cl.⁷ ............................................... H04J 3/02
(52) U.S. Cl. ................................... 370/395.4; 370/462
(58) Field of Search ................................ 370/386, 388, 370/412–416, 419, 462, 229–235.1, 360, 370/389, 395.4

(56) References Cited

U.S. PATENT DOCUMENTS

| | | | |
|---|---|---|---|
| 5,126,999 A | 6/1992 | Munter et al. | 370/60 |
| 5,500,858 A | 3/1996 | McKeown | 370/60 |
| 5,590,123 A * | 12/1996 | Lyles et al. | 370/397 |
| 5,724,352 A * | 3/1998 | Cloonan et al. | 370/388 |
| 5,838,684 A * | 11/1998 | Wicki et al. | 370/416 |
| 5,953,341 A * | 9/1999 | Yamanaka et al. | 370/416 |

* cited by examiner

Primary Examiner—Huy D. Vu
Assistant Examiner—Daniel Ryman
(74) Attorney, Agent, or Firm—Pillsbury Winthrop Shaw Pittman LLP

(57) ABSTRACT

A scheduling means for data switching apparatus includes a plurality of input ports and a plurality of output ports, the scheduling means capable of processing a plurality of interconnection requests, each requesting interconnection between a sub-set of the input ports and a sub-set of respective the output ports, and each request having a respective priority level which is one of a predetermined number of priority levels. The scheduling means includes determination means for determining a first set of requests selected from the plurality of requests, according to the respective priority levels; a first pipeline stage for receiving only the first set of requests am satisfying at least one of the first set of requests; a priority mixer for determining a further set of requests independently of the priority levels, the further set including requests of the first set which were not satisfied and requests included in the plurality of requests which were not part of the first set and which are of any of the priority levels, and an additional pipeline stage for identifying requests in the further set which can be satisfied, and for satisfying the identified requests.

8 Claims, 1 Drawing Sheet

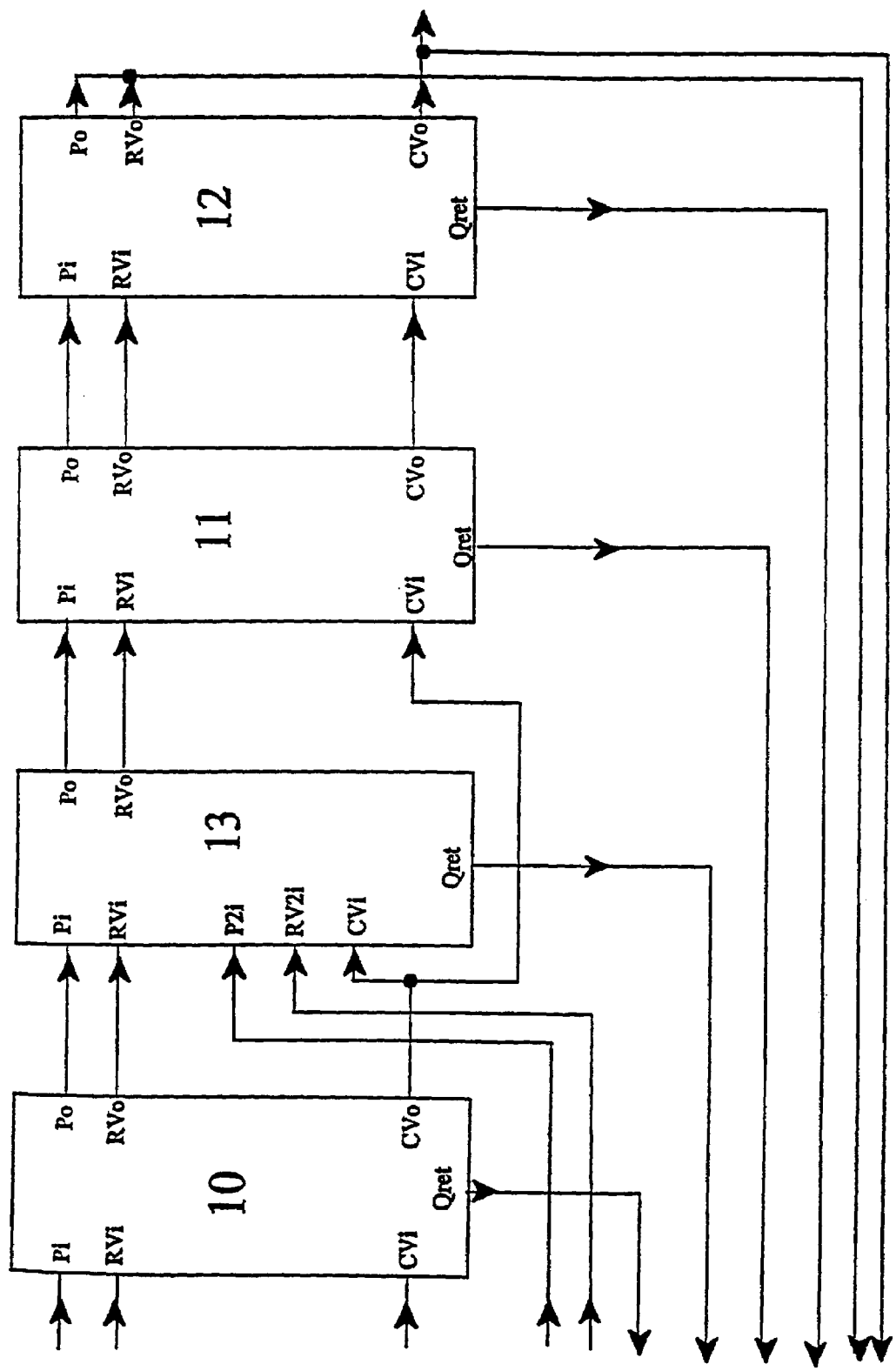

1

SCHEDULING MEANS FOR DATA SWITCHING APPARATUS

BACKGROUND OF THE INVENTION

1. Field of the Invention

This invention relates to scheduling means for data switching apparatus for use in computer-controlled digital data switching systems.

2. Description of the Related Art

Many types of data transmission apparatus are known, all having their own particular features and systems. In all cases the intention is to allow data switching and transmission to be achieved as rapidly as the apparatus will allow. It is common for data to be sent in "packets" consisting of a predetermined number of bits of data plus control information indicating certain parameters of the data or its mode of transmission.

In data switching apparatus having an number of users there may be a requirement at any one time to set up a number of different interconnections between input ports and output ports. In any form of switch there is a limit to the number of simultaneous interconnections that may be formed. The switch is operating at its greatest efficiency when the greatest possible number of interconnections is formed and switching apparatus frequently includes what may be termed "scheduling means" in order to achieve this maximum number of interconnections.

A good scheduling scheme needs to balance the potentially conflicting objectives of making sure that all output ports are connected where there are requests for a connection to that port (efficiency), that high priority traffic is serviced quickly (prioritisation) and that low priority traffic is not ignored (fairness). The present invention addresses all of these issues and may, for example, be used with the data switching apparatus described and claimed in our co-pending British patent application No. 9717412.2.

Various types of scheduling means are known. For example, U.S. Pat. No. 5,500,858 describes one form of scheduling means in which requests for interconnections are considered and satisfied using what are called "rotating priority iterative matching desynchronising scheduler units". The "priority" in this case refers to priority given to input and output ports at any given time so as to ensure that each port has a fair chance of having a connection requests satisfied. The U.S. Patent goes on to describe how the scheme could be extended to handle requests at multiple priority levels but the scheme described would lack fairness, that is low priority requests would be ignored under heavy load conditions where only higher priority requests would be satisfied.

SUMMARY OF THE INVENTION

It is an object of the present invention to provide data switching apparatus which includes scheduling means operable to satisfy a greater number of requests for interconnections than has previously been possible under such circumstances.

According to the present invention there is provided scheduling means for data switching apparatus having a plurality of input ports and a plurality of output ports between which data having one of a predetermined number of priority levels is to be passed, which scheduling means includes a first pipeline stage operable to satisfy at least some of the requests for interconnections which are applied to the scheduling means, a priority mixer to which are applied those requests for interconnections which were not satisfied by the first pipeline stage together with requests of different priority levels and operable to select which of those requests should be further considered, and at least one further pipeline stage to which are applied said further requests and operable to satisfy such of those requests as are possible and were not satisfied by any preceding pipeline stage.

The present invention overcomes the problems associated with the known prior art by using existing types of scheduling units, (for example those described in U.S. Pat. Nos. 5,500,858 and 5.267,235, though any scheduling means which operates as described herein may be used) but connecting them in a novel arrangement. The scheduling means to be described may, for example, be used with the data switching apparatus described and claimed in our co-pending British patent application No. 9717412.2.

BRIEF DESCRIPTION OF THE DRAWING

The invention will now be described with reference to FIG. 1, which shows a schematic block diagram of one embodiment of the invention.

DETAILED DESCRIPTION

The drawing shows three pipeline stages 10 to 12, with a priority mixer 13 connected between pipeline stages 10 and 11. Input connections and output connections are provided to the various pipeline stages and the priority mixer as shown and the operation of the arrangement will be described below.

Each of the pipeline stages 10, 11 and 12 operates to receive input connection Request Vectors RVi at Priority level Pi and a Connection Vector CVi. In response to these inputs the pipeline stage generates output signals Queue Return QRet, Request Vector out RVo, Priority out Po and Connection Vector out CVo. The Request Vectors are bit fields where each bit corresponds to a possible connection between one of the input ports and one of the output ports of the data switching apparatus. That is, if there are n input ports and m output ports, the Request Vectors will be n×m bits wide, where a bit that is set indicates that a connection is being requested from the corresponding input port to the corresponding output port, whilst a bit that is clear indicates that such a connection is not being requested at this time. The Priority fields Pi and Po indicate the priority of the connection being requested at input (RVi) and output (RVo) respectively. The connection requests from each input port are all of the same priority, though the connections requested from different input ports may be of different priorities. The Connection Vector signal CVo defines connections which are to be made by a switching matrix (not shown). They indicate which input port, if any, is to be connected to each output port of the data switching apparatus. The Queue Return signals Qret represent connection requests that cannot be satisfied. These requests are returned to the input queues of the data switching apparatus ready to be requested again. The operation performed by each pipeline stage is to consider the connection requests at RVi and satisfy as many of them as possible, adding details of each satisfied connection to any already present at CVi and presenting the combined set of connections at CVo. Since each input port and each output port may only be involved in one connection at any given time, any connection requests which involve an input port or output port which is already part of a satisfied connection request may no longer be satisfied within the present set of connections and so such requests are returned to the input queues (signal Qret), to be considered as part of a subsequent set of connections. The remaining connection requests (those for which the corresponding input and output ports are still available for connection) are presented at the RVo output of the pipeline stage in order for them to be considered by a subsequent pipeline stage. Any such requests at the output of the last pipeline stage 13 (where there is no subsequent pipeline stage to consider them) are returned to the input queues of the data switching apparatus, as with the Qret output.

Consider now the overall operation of the scheduling means described above. At the input to the first pipeline stage, 10 requests for connections RVi at a single priority level Pi are presented. The first pipeline stage 10 then attempts to satisfy as many of these requests as possible. Traffic of each priority level is presented to the first pipeline stage 10 at a frequency proportional to the required bandwidth allocation for that priority level. For example, high priority level requests could be presented 50% of the time if a 50% bandwidth allocation for high priority traffic was required. The proportions assigned to each priority level would depend on the application and would be assigned by the system administrator and be independent of the operation of the pipeline stage. A lookup table may be used to define the priorities for each priority level. If there is only a small number of requests at the priority Pi then the first pipeline stage 10 will not make many connections and most of the input and output ports will not be utilised within the set of connections created by this stage, nor will there be many connection requests outstanding at that priority level which may be satisfied by the remaining pipeline stages 11 and 12. For this reason, the priority mixer 13 is introduced between the first and second pipeline stages 10 and 11. Applied to priority mixer 13 are connection requests RV2i of priorities other than Pi, the priorities of the requests being denoted by P2i. The priority mixer 13 decides, for each input port, whether to pass on to the second pipeline stage 11 the requests RVi remaining at priority level Pi from the first pipeline stage 10 or the new requests RV2i. The decision is made on the basis of choosing whichever set of requests has the highest number of requests that could still be satisfied within the current Connection Vector CVi, taking into account which input and output ports are already used by satisfied connection requests. This leads to higher connectivity within the data switching apparatus than if only requests of a single priority were considered, that is it is more efficient. It also allows good performance for low priority traffic in the absence of any higher priority traffic, since the low priority requests may be presented at the second pipeline stage 11 via the priority mixer 13, regardless of how infrequently low priority requests are selected to be presented to the first pipeline stage 10. The Connection Vector output CVo of the last pipeline stage 13 defines all the connections that are to be made by the data switching apparatus in the next cycle of operation.

Since mixing requests of different priorities at the second and subsequent stages of the scheduling means leads to greater efficiency, it might seem like a good idea to do the same at the first pipeline stage 10. However, the scheduling units that make up each pipeline stage do not themselves take any account of the priority of each request, that is they treat all requests equally. Hence if requests of different priorities were presented to the first pipeline stage there would be no concept of priority at all within the scheduling means, since the low priority requests would compete equally with the high priority requests for connections. Thus it will be seen that the first pipeline stage provides prioritisation and fairness as defined above, whilst the subsequent pipeline stages provide efficiency.

Further pipeline stages may be added if it is felt that three stages are not able to provide sufficiently high efficiency of switch utilisation. There is a trade-off between switch utilisation (how many connection requests may be satisfied at any time) and latency (each pipeline stage takes time to operate), so that the number of pipeline stages required will depend upon what balance of these factors is required for a particular embodiment. In general, more pipeline stages are needed to create maximal sets of connections as the number of ports in the data switching apparatus increases. In addition, priority mixer elements may be placed between others of the pipeline units to further increase efficiency if desired.

Instances may occur when, for example, certain connections between input ports and output ports are to be retained for a period of time (static or permanent connections). Alternatively, it may be necessary at certain times to block specified input ports or output ports (during a period of system maintenance, for example). Similarly, it may be necessary at certain times to set up connections from one input port to more than one output port at the same time (multicast). All of these facilities may be incorporated into data switching apparatus which uses the scheduling means described above. This is done by connecting appropriate logic to the inputs of the first pipeline stage 10 and/or the priority mixer 13. For instance, to create a permanent connection between an input port and an output port, the CVi input of the first pipeline stage 10 could be preset to indicate the required connection(s) rather than having all of its bits clear (indicating no pre-existing connections). Input and output ports may be blocked by masking off the appropriate bits of the RVi input of the first pipeline stage 10 and the RV2i input of the priority mixer 13. Multicast connections may be made in the same way as permanent connections, except that more than one output port is set up to be connected to the desired input port. In all of these cases, the scheduling means works around the existing connections or blocked ports, making whatever connections it can between the remaining unconnected and non-blocked input and output ports.

What is claimed is:

1. Scheduling means for data switching apparatus having a plurality of input ports and a plurality of output ports, the scheduling means capable of processing a plurality of interconnection requests, each request requesting interconnection between a subset of said input ports and a subset of respective said output ports, and each request having a respective priority level (Pi) which is one of a predetermined number of priority levels; the scheduling means comprising:

determination means for determining a first set of said requests selected from the plurality of requests, according to said respective priority levels; and a first pipeline stage for receiving only said first set of requests and satisfying at least one of the first set of requests;

a priority mixer for determining a further set of said requests independently of said priority levels, the further set including requests of said first set which were not satisfied and requests included in said plurality of requests which were not part of said first set and which are of any of said priority levels; and an additional pipeline stage for identifying requests in said further set which can be satisfied, and for satisfying the identified requests.

2. Scheduling means according to claim 1 wherein said determination means at any time determines said first set of requests as having the same priority level and wherein said priority level is a selected priority level.

3. Scheduling means according to claim 2 wherein the determination means varies the selected priority level with time, and wherein the proportion of time for which the selected priority level takes each of said predetermined number of priority levels is a respective predetermined proportion of time.

4. Scheduling means according to claim 1 further comprising at least one further pipeline stage receiving the requests not satisfied by the additional pipeline stage, a first of the at least one further pipeline stage receiving the requests not satisfied by the additional pipeline stage, and each of the other at least one further pipeline stages receiving the requests not satisfied by a preceding further pipeline stage.

5. Scheduling means according to claim 4 further comprising priority mixer provided before any of said further pipeline stages.

6. Scheduling means according to claim 1 which employs a data array ($CV_1$, $CV_0$) defining connections, each of said pipeline stages satisfying said requests by modifying said data array.

7. Scheduling means according to claim 6 wherein upon receiving instructions specifying predetermined connections between at least two of the ports, said data array ($CV_1$, $CV_0$) is modified to include said predetermined connections.

8. Scheduling means according to claim 1, further comprising means which, upon receiving instructions to inhibit connections to or from any of the input or output ports, modifies the inputs to the first pipeline stage and priority mixer to prevent connections to or from said inhibited ports.

* * * * *